United States Patent [19]

Hosokawa et al.

[11] 4,252,906
[45] Feb. 24, 1981

[54] PROCESS FOR PREPARING FOAMED AND CROSSLINKED SHAPED ARTICLES HAVING IMPROVED HEAT-SEALABILITY AND FOAMABLE AND CROSSLINKABLE POLYETHYLENE RESIN COMPOSITION USED THEREFOR

[75] Inventors: Seiya Hosokawa, Ibaraki; Ken Shinkai, Hirakata; Tateo Takasuka, Toyonaka; Yutaka Ozaki, Osaka, all of Japan

[73] Assignee: Sekisui Kagaku Kogyo Kabushiki Kaisha, Osaka, Japan

[21] Appl. No.: 831,127

[22] Filed: Sep. 7, 1977

[51] Int. Cl.³ ............................................. C08J 9/10
[52] U.S. Cl. ..................................... 521/86; 521/93; 521/95; 521/96; 521/97; 521/143; 521/154; 521/909; 525/288; 525/342
[58] Field of Search ...................... 260/2.5 E, 2.5 HA; 521/86, 93, 95, 96, 143, 154, 909

[56] References Cited

U.S. PATENT DOCUMENTS

| 3,017,371 | 1/1962 | Hohenberg et al. ............. 260/2.5 E |
| 3,608,006 | 9/1971 | Hosoda et al. ................. 260/2.5 HA |
| 3,651,183 | 3/1972 | Hosoda et al. ................. 260/2.5 HA |
| 4,160,072 | 7/1979 | Shinkai et al. ......................... 521/86 |

FOREIGN PATENT DOCUMENTS 1286460  8/1972  United Kingdom ................... 260/94.9

OTHER PUBLICATIONS

"Plastics Progress 1955", p. 69, Edited by Philip Morgan–British Plastics Convention 1955.
"Celogen-A2" by R. R. Barnhart, Compounding Research Report No. 38, pp. 1-11.

Primary Examiner—Morton Foelak
Attorney, Agent, or Firm—Sherman and Shalloway

[57] ABSTRACT

A process for preparing a foamed and crosslinked polyethylene resin shaped article having improved heat-sealability, which comprises melt-kneading (a) a silane-modified polyethylene resin, (b) a heat-decomposable blowing agent, (c) a silanol condensation catalyst, and (d) an organic peroxide at a temperature lower than the decomposition temperature of the heat-decomposable blowing agent (b), shaping the mixture, and heating the resulting foamable and crosslinkable shaped articles to the decomposition temperature of the heat-decomposable blowing agent or to a higher temperature thereby to foam and crosslink it; and a foamable and crosslinkable polyethylene resin composition used therefor.

58 Claims, No Drawings

PROCESS FOR PREPARING FOAMED AND CROSSLINKED SHAPED ARTICLES HAVING IMPROVED HEAT-SEALABILITY AND FOAMABLE AND CROSSLINKABLE POLYETHYLENE RESIN COMPOSITION USED THEREFOR

This invention relates to a foamed or expanded and crosslinked shaped article. More specifically, it relates to a process for producing a foamed and crosslinked shaped article having improved heat-sealability and to a foamable or expandable and crosslinkable polyethylene resin composition used therefor.

In the present specification and the appended claims, the terms "foamed" and "expanded" are used interchangeably, and so are the terms "foamable" and "expandable" and like terms derived from "foam" and "expand" as verbs.

A number of techniques for preparing crosslinked polyethylene foams from polyethylene have heretofore been suggested. For example, Japanese Patent Publication No. 6278/66 discloses a process which comprises applying ionizing radiation to a sheet prepared from polyethylene containing a heat-decomposable blowing agent, and heating the resulting crosslinked polyethylene sheet at atmospheric pressure to expand it. Furthermore, Japanese Patent Publication No. 17436/64 suggests a process which comprises mixing polyethylene with an organic peroxide (chemical crosslinking agent) and a blowing agent, heating the mixture to crosslink it, and foaming it at atmospheric pressure.

The suggested processes are called "general atmospheric pressure foaming method", and are utilized commercially for the production of polyethylene foams. In radiation-initiated crosslinking and foaming techniques typified by the process of Japanese Patent Publication No. 6278/66 cited above, electron beams are usually the only source of commercially available radiation. Since electron beams have a weak penetrating power, their effect does not extend to the inside of a polyethylene sheet having a large thickness. The utilization of the radiation-initiated crosslinking and foaming technique is therefore limited to sheets having a thickness of about 10 mm at most. On the other hand, the process of Japanese Patent Publication No. 17436/64 using chemical crosslinking agents suffers from the defect that crosslinking tends to begin at the time of melt-kneading polyethylene containing a chemical crosslinking agent, and this makes its subsequent molding difficult. Furthermore, since crosslinking and foaming proceed almost simultaneously in this process, it is difficult to retain the form of a molded article which is being crosslinked and foamed. Another defect is that because there is a difference in the degree of crosslinking reaction between the surface layer and the inside layer, the resulting foamed article is non-uniform with the cell diameters being different between the surface layer and the inside layer. This tendency becomes greater when it is desired to obtain foamed articles of larger thickness. With the latter method, it is also difficult to obtain foamed article having a fine cellular structure.

In an attempt to remedy these defects, Japanese Laid-Open Patent Publications Nos. 100470/73, 106569/74 and 130460/74 suggest a process which comprises chemically bonding a silane compound containing at least one unsaturated bond to polyethylene in the presence of a radical generator to form silane-modified polyethylene, and heating the silane-modified polyethylene together with a silanol condensation catalyst and a heat-decomposable blowing agent such as azodicarbonamide to a temperature above the decomposition temperature of the blowing agent, thereby to expand and crosslink the modified polyethylene.

German Offenlegungsschrift No. 2,611,491 suggests a process for preparing crosslinked polyethylene foams, which comprises melt-kneading (a) modified polyethylene obtained by chemically bonding a silane compound containing at least one unsaturated group in the presence of a radical generator, (b) a zinc salt of a higher carboxylic acid and (c) a heat-decomposable blowing agent at a temperature below the decomposition temperature of the heat-decomposable blowing agent, shaping the kneaded mixture into a desired shape, and heating the shaped article to a temperature above the decomposition temperature of the heat-decomposable blowing agent to expand and crosslinked the shaped article.

The foamed, crosslinked shape article disclosed in the Japanese Laid-Open Patent Publications or the German Offenlegungsschrift cited above which is prepared by heat-foaming a composition comprising a silane-modified polyethylene resin, a heat-decomposable blowing agent and a silanol condensation catalyst has the advantage of high crosslinking density and superior thermal stability. On the other hand, this foamed and crosslinked shaped article has the defect that it is difficult to bond such shaped articles to each other by, for example, heating (namely, it has poor heat-sealability). Thus, this shaped article lacks secondary processability in processing it into final products such as laminates and cylindrical articles.

Many suggestions such as the physical or chemical surface treatment of plastics, or the coating of a special adhesive composition on the surface of plastics, have been made to improve the adhesiveness of plastics.

As the first-mentioned surface-treating method, the treatment of the surface of a plastic material with ozone, and the treatment of the surface of a plastic article with an oxygen gas excited with a high frequency energy have been reported (see, for example, Japanese Laid-Open Patent Publication No. 73976/75). These methods, however, require large-scale equipment, and since they only increase the adhesiveness of the treated surface, the treatment will be again needed when it is desired to bond the untreated surface.

The method involving coating a special adhesive composition is typified by the method disclosed in Japanese Patent Publication No. 4334/66 which comprises coating a polyolefin article with a polypropylene solution containing an organic peroxide and an antioxidant, and heating it to accomplish bonding. Since this method requires a troublesome operation of coating the adhesive composition every time the bonding is to be performed, and a relatively long period of time is needed to crosslink the coated layer, it is difficult to apply to foamed articles.

It is an object of this invention therefore to provide a process for easily producing a foamed and crosslinked shaped article having improved heat-sealability and based on a silane-modified polyethylene resin.

Another object of this invention is to provide a process for producing a shaped article of a foamed and crosslinked polyethylene resin which has superior heat-sealability not only at its surface but in its interior.

Still another object of this invention is to provide a foamable and crosslinkable polyethylene resin composition which can give a foamed and crosslinked shaped article having improved heat-sealability.

Other objects and advantages of this invention will become apparent from the following description.

According to this invention, there is provided a process for producing a foamed and crosslinked polyethylene resin shaped article having improved heat-sealability, which comprises melt-kneading (a) a silane-modified polyethylene resin, (b) a heat-decomposable blowing agent, (c) a silanol condensation catalyst, and (d) an organic peroxide at a temperature lower than the decomposition temperature of the heat-decomposable blowing agent (b), shaping the mixture, and heating the resulting foamable and cross-linkable shaped article to the decomposition temperature of the heat-decomposable blowing agent or to a higher temperature thereby to foam and crosslink it.

The term "silane-modified polyethylene resin", as used in the present specification and the appended claims, denotes a modified polyethylene resin obtained by chemically bonding a silane compound containing at least one unsaturated group to a polyethylene-type resin in the presence of a radical generator, as disclosed, for example, in Japanese Patent Publication No. 1711/73.

The term "polyethylene-type resin", as used in the present specification and the appended claims, is meant to include not only a homopolymer of ethylene, but also an ethylene copolymer composed of at least 50 mole%, preferably at least 70 mole%, of an ethylene unit and a minor proportion of a monomer copolymerizable with ethylene, and a blend of at least 50% by weight, preferably at least 60% by weight, of the ethylene homopolymer or copolymer with another polymer.

Examples of monomers copolymerizable with ethylene are vinyl acetate, vinyl chloride, propylene, butene, hexene, acrylic acid and its esters, methacrylic acid and its esters. The other polymer that can be blended with the ethylene homopolymer or copolymer may be any polymer compatible with it. Examples are polypropylene, polybutadiene, polyisoprene, polychloroprene, chlorinated polyethylene, polyvinyl chloride, a styrene/butadiene copolymer, a vinyl acetate/ethylene copolymer, an acrylonitrile/butadiene copolymer, a vinyl chloride/vinyl acetate copolymer, etc. Especially preferred species are polypropylene, polybutadiene and styrene/butadiene copolymer.

Examples of polyethylene that can be advantageously employed in the present invention are low-, medium- and high-density polyethylene, an ethylene/vinyl acetate copolymer, an ethylene/propylene copolymer, a blend of polyethylene and polypropylene, a blend of polyethylene and an ethylene/vinyl acetate copolymer, and a blend of polyethylene and an ethylene/propylene copolymer. Of these, the medium density polyethylene, low density polyethylene, and ethylene/propylene copolymer are especially suitable.

Preferably, the polyethylene resins have a softening point of less than 130° C. Furthermore, it is preferred that the polyethylene resin have a melt index of 2.0 to 20, a number average molecular weight of 20,000 to 60,000, an intrinsic viscosity, at 75° C. in xylene, of 0.8 to 1.1, and a density of 0.910 to 0.940.

In the present invention, the silane-modified polyethylene resin is prepared by chemically bonding a silane compound containing at least one unsaturated group to the polyethylene resin described above in the presence of a radical generator.

The silane compound used in this invention is an organosilicon compound containing at least one unsaturated group capable of being chemically bonded to the sites of free radicals generated in the polymer chain of the polyethylene as a result of radical reaction, for example the silane compounds described in Japanese Patent Publication No. 1711/73, and typically includes organosilane compounds of the following formula

wherein one or two, preferably only one, of $R_1$, $R_2$, $R_3$ and $R_4$ represent a hydrocarbon or hydrocarboxy group containing a radical-polymerizable double bond, and the rest represent organic residues capable of being split off by hydrolysis.

In the above formula, examples of the hydrocarbon group containing a radical-polymerizable double bond are vinyl, allyl, 2-methylallyl, butenyl, cyclohexenyl, cyclopentadienyl, and octadienyl, and examples of the hydrocarbonoxy group containing a radical-polymerizable double bond include allyloxy and 2-methyl allyloxy. Other examples include

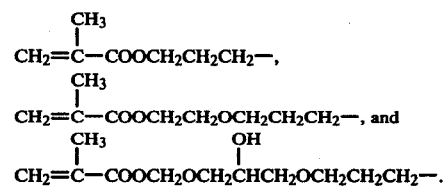

Of these, vinyl is most preferred.

Examples of the organic residues capable of being split off by hydrolysis include an alkoxy group such as methoxy, ethoxy or butoxy; an acyloxy group such as formyloxy, acetoxy or propionoxy; an oxime group such as

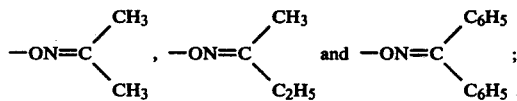

and a substituted amino group, for example, an alkyl amino or aryl amino group, such as methyl amino, ethyl amino or phenyl amino. Of these, the alkoxy groups are especially preferred.

The silane compound preferably contains three hydrolyzable organic groups.

Vinyl trimethoxysilane and vinyltriethoxysilane can be most conveniently used in the present invention.

The amount of the silane compound is not critical, and can be varied widely according, for example, to the type of polyethylene resin, the desired degree of modification, and the reaction conditions. Generally, its amount is 0.1 to 50 parts by weight, preferably 0.3 to 30 parts by weight, and most preferably 0.5 to 10 parts by weight, per 100 parts by weight of the polyethylene resin.

Advantageously, radical generators used in the reaction between the polyethylene resin and the silane compound are those which decompose upon heating and generate radicals. The radical generator acts as a reaction initiator at the time of chemically bonding the silane compound to the polyethylene resin. Preferably, these radical generators generally have a half life of 6 minutes or less, preferably 3 minutes or less, and most preferably 1 minute or less, at the melt-kneading temperature of the polyethylene resin. Typical examples of such radical generators include organic peroxides such as benzoyl peroxide, dichlorobenzoyl peroxide, or lauroyl peroxide; organic peroxides such as t-butyl peracetate, t-butyl peroxy-2-ethyl hexanoate, or t-butyl peroxy isobutyrate, t-butyl peroxy benzoate, dicumyl peroxide, 2,5-dimethyl-2,5-di(t-butyl-peroxy)hexane, 2,5-dimethyl-2,5-di(t-butyl-peroxy)hexyne-3, di-t-butyl peroxide, 2,5-di(peroxybenzoate)hexyl-3 or 1,3-bis(t-butyl-peroxyisopropyl)benzene; and azo compounds such as azobisisobutyronitrile or dimethyl azodiisobutyrate. Dicumyl peroxide is most preferred.

In any situation, a specified radical generator is selected depending upon the temperature at which the polyethylene resin is reacted with the silane compound. For example, when the reaction is to be carried out at about 190° to 200° C., dicumyl peroxide which has a half life of about 15 seconds at this temperature is suitable. When the reaction is to be carried out at about 150° C., benzoyl peroxide having a preferred half life at this temperature is suitable.

The amount of the radical generator is not limited in particular, and can be varied over a wide range according, for example, to the type of the polyethylene resin used or the amount of the silane compound. Although the radical generator should be used in an amount sufficient for performing the desired degree of modification, it should not be used such that the ordinary crosslinking of the polyethylene resin becomes a main reaction mechanism. Generally, its suitable amount is 0.01 to 1.5 parts by weight, preferably 0.1 to 1.0 part by weight, per 100 parts by weight of the polyethylene resin.

The bonding of the silane compound to the polyethylene resin can be performed easily by the method to be described hereinbelow.

For example, the polyethylene resin, the radical generator, and the silane compound are fed into an extruder, and the radical generator is decomposed while melting the polyethylene resin, thereby to chemically bond the silane compound to the polyethylene resin.

When the resulting silane-modified polyethylene resin is heated in the presence of a silanol condensation catalyst to be described hereinbelow, the organic group of the silane group bonded to the polyethylene resin is hydrolyzed under the influence of moisture in the resin or in the ambient atmosphere to generate a crosslinkage.

Ordinary heat-decomposable blowing agents used heretofore in the production of polyethylene foams can also be used in the present invention. Especially preferred blowing agents are those which decompose at a temperature of more than 140° C., preferably between 170° to 220° C., to generate gas. Specific examples include azodicarbonamide, dinitrosopentamethylene tetramine, benzenesulfonyl hydrazide, and toluenesulfonyl hydrazide. Azodicarbonamide is especially advantageous because of its good thermal stability and suitable decomposition temperature. These blowing agents can be used either alone or as mixtures, and the amount of the blowing agent can be varied over a wide range according, for example, to the degree of expansion required of the final foamed shaped article. Usually, its amount is at least 0.1 part by weight, preferably 1 to 30 parts by weight, most preferably 10 to 20 parts by weight, per 100 parts by weight of the silane-modified polyethylene resin.

All silanol condensation catalysts which are usually employed to form a crosslinkage in silane-modified polyethylene resins are feasible as the silanol condensation in this invention. Examples of the silanol condensation catalyst are organometallic compounds such as dibutyltin dilaurate, stannous acetate, stannous octanoate (stannous caprylate), lead naphthenate, zinc caprylate, iron 2-ethylhexanoate, cobalt naphthenate, and titanic acid esters and titanium chelate compounds [e.g., tetrabutyl titanate, tetranonyl titanate, or bis-(acetylacetonitrile)diisopropyl titanate]; organic bases such as ethylamine, hexylamine, dibutylamine or pyridine; acids such as inorganic acids (e.g., hydrochloric acid and phosphoric acid) and fatty acids (e.g., stearic acid, linoleic acid and octylic acid). Of these, zinc salts of higher carboxylic acids are preferred. These catalyst compounds can be used either alone or as mixtures. Especially preferred zinc salts of higher carboxylic acids are zinc salts of aliphatic or alicyclic carboxylic acids containing 8 to 20 carbon atoms, preferably 8 to 17 carbon atoms. Examples of these zinc salts include zinc stearate, zinc octanoate, zinc laurate, and zinc naphthenate, and the use of the zinc stearate is especially preferred.

These higher carboxylic acid zinc salts may be mixed with a minor amount of another silanol condensation catalyst of the above-exemplified species, for example, organotin compounds such as dibutyltin dilaurate, dibutyltin maleate or dibutyltin diacetate. The amount of the other silanol catalyst in the mixture should be minimized, and preferably limited to not more than 5% based on the total weight of the mixed silanol catalyst.

When such higher carboxylic acid zinc salts are used as the silanol condensation catalyst, a silane-modified polyethylene resin composition in accordance with this invention which contains such a silanol condensation catalyst, if heat-formed after standing for a long period of time for storage or transportation, can still give a foamed shaped article having a good cellular structure without generating any abnormal cells.

The amount of the silanol condensation catalyst can be varied according to the type and amount of the silane compound bonded to the modified polyethylene resin. Generally, its amount is at least 0.01 part by weight, preferably 0.1 to 20 parts by weight, most preferably 0.5 to 10 parts by weight, per 100 parts by weight of the silane-modified polyethylene resin.

The important feature of the present invention is the use of an organic peroxide as an essential component in addition to the silane-modified polyethylene resin, the heat-decomposable blowing agent and the silanol condensation catalyst. It has been found that this leads to the markedly improved heat-sealability of the foamed and cross-linked shaped article finally obtained.

The type of the organic peroxide that can be used in this invention is not critical, and can be selected from a wide variety of organic peroxides. It is preferred to select organic peroxides having a half life of at least 0.5 minute, preferably at least 1 minute, more preferably at least 5 minutes, at the temperature of melt-kneading to avoid the disappearance of the organic peroxide at the time of melt-kneading.

Desirably, the organic peroxide has the same or similar decomposition temperature as or to the decomposition temperature of the heat-decomposable blowing agent, and decomposes simultaneously with the heat decomposition of the blowing agent. Generally, the organic peroxide has a decomposition temperature of more than 140° C., preferably 170° to 220° C.

Specific examples of the organic peroxide that can be used in this invention include ketone peroxides such as methyl ethyl ketone peroxide, cyclohexanone peroxide or 1,1-bis(t-butylperoxy)-3,5,5-trimethylcyclohexane; hydroperoxides such as t-butyl hydroperoxide, cumene hydroperoxide, diisopropylbenzene hydroperoxide, para-menthane hydroperoxide or 2,5-dimethylhexane-2,5-dihydroperoxide; dialkyl peroxides such as di-t-butyl peroxide, dicumyl peroxide, 2,5-dimethyl-2,5-di(t-butylperoxy)hexane or 2,5-dimethyl-2,5-di(t-butylperoxy)hexane-3, and peroxy esters such as t-butylperoxy acetate, t-butylperoxy benzoate, di-t-butyl-diperoxy phthalate, 2,5-dimethyl-2,5-di(benzoyl peroxy)hexane, t-butylperoxy maleate or t-butylperoxy isopropyl carbonate. In the present invention, dicumyl peroxide, 2,5-dimethylhexane-2,5-dihydroperoxide, and 2,5-dimethyl-2,5-di(t-butylperoxy)hexane are preferred. Among them, dicumyl peroxide is especially preferred.

These organic peroxides can be used either alone or as mixtures of two or more.

The amount of the organic peroxide is not critical, and can be varied widely according to the type of the silane-modified polyethylene resin used, the conditions for melt-kneading, the temperature of heat-foaming, etc. Generally, it can be used in an amount of at least 0.005 part by weight, preferably 0.01 to 1.0 part by weight, more preferably 0.05 to 0.5 part by weight, and most preferably 0.1 to 0.3 part by weight, per 100 parts by weight of the silane-modified polyethylene resin.

If desired, the composition of this invention may further include a chain transfer agent. The chain transfer agent used in this invention has an action of deactivating any portion of the radical generator which remains unreacted at the time of the silane-modifying polyethylene resin in the presence of the radical generator. Examples of suitable chain transfer agents are dodecyl mercaptan, t-butyl mercaptan, n-butyl mercaptan, octyl mercaptan, and α-methylstyrene. The chain transfer agent inhibits the crosslinking reaction of polyethylene and permits the silane compound-bonding reaction to proceed effectively. When such a chain transfer agent is used, its amount is 0.01 to 0.5 part by weight, preferably 0.03 to 0.1 part by weight, per 100 parts by weight of the silane-modified polyethylene resin.

If desired, the composition of this invention may contain conventional additives such as coloring agents (e.g., cadmium yellow, quinacridone red, cobalt blue, cadmium red, red iron oxide, titanium oxide, zinc oxide, and carbon black); nucleating agents (e.g., talc, diatomaceous earth, calcium carbonate, zinc stearate, and aluminum stearate); lubricants (e.g., paraffin, or stearic acid); stabilizer (e.g., 2-hydroxy-4-methoxybenzophenone, or 2,6-ditert-butyl hydroxytoluene); fire retardants (e.g., antimony oxide, and chlorinated paraffin); fillers (e.g., calcium oxide, magnesium oxide, sodium carbonate, potassium carbonate, strontium carbonate, barium sulfate, lithopone, magnesium carbonate, calcium carbonate, silica, kaolin clay, and talc); foaming aids (e.g., zinc oxide, zinc stearate and zinc octanoate), and deterioration inhibitors (e.g., t-butyl p-cresol and dilauryl thiopropionate) in the amounts usually employed in the art.

According to the present invention, (a) the silane-modified polyethylene resin, (b) the heat-decomposable blowing agent, (c) the silanol condensation catalyst and (d) the organic peroxide, with or without the optional ingredients described hereinabove, are melt-kneaded at a temperature lower than the decomposition temperature of the heat-decomposable blowing agent, and then shaped.

The modified polyethylene resin can be prepared in advance of melt-kneading. Thus, polyethylene resin is mixed (e.g., dry-blended) with the radical generator and the silane compound in the proportions indicated hereinabove, and the mixture is melted and kneaded at a temperature above the melting temperature of the polyethylene, preferably at a temperature higher than 150° C. The melt-kneading can be carried out using an ordinary extruder, calender roll, roll mill, or the like. The reaction time is generally about 1 to 10 minutes when the reaction system is in the molten state.

The molten polyethylene resin so formed can be shaped into a suitable form such as pellets. Or it can be used in the molten state, and successively kneaded with the blowing agent, the silanol condensation catalyst and the organic peroxide to afford the foamable and crosslinkable composition in accordance with this invention.

The resulting silane-modified polyethylene is blended with the heat-decomposable blowing agent, the silanol condensation catalyst and the organic peroxide in the amounts indicated hereinabove, and the mixture is melt-kneaded with or without other optional ingredients at a temperature below the decomposition temperature of the heat-decomposable blowing agent.

Mixing of the ingredients can be performed by conventional means, for example, using a kneader, blender or mixer. The melt-kneading can be carried out using, for example, an extruder, roll, or injection molding machine in which the polyethylene is melted by heat and kneaded with the other ingredients.

The temperature for melt-kneading is above the melting temperature of the silane-modified polyethylene resin used and below the decomposition temperature of the heat-decomposable blowing agent. Accordingly, it is difficult to determine the melt-kneading temperature unequivocally, and is properly determined according to the type of the bonding agent used or the type of the polyethylene resin used, etc. Usually, the melt-kneading temperature is preferably about 110° to about 150° C., more preferably about 120° to about 140° C. It is sufficient to perform kneading for about 1 to 10 minutes at this temperature.

The melt-kneaded composition is then fabricated into a desired shape such as a sheet, plate, rod, cylinder or block. The fabrication can be performed by a known method such as extrusion molding, injection molding or blow molding.

The resulting expandable and crosslinkable polyethylene resin composition has a gel content of not more than 45%, preferably 10 to 40%, more preferably 15 to 35% by weight. Usually, the polyethylene resin composition obtained is substantially uncrosslinked although depending upon the method of its preparation. In such a case, it is preferred to preheat it prior to heat-foaming so as to pre-crosslink it to a gel content within the above range.

The foamable and crosslinkable polyethylene resin composition in accordance with this invention can be converted to foamed shaped articles crosslinked to a high degree by subsequent molding and heat-foaming.

The gel content of the final foamed shaped article can be raised to at least 50% by weight, usually to 60 to 80% by weight. Thus, crosslinked polyethylene resin foams having superior thermal stability and heat-stability can be prepared from the composition of this invention.

When a zinc salt of a higher carboxylic acid is used as the silanol condensation catalyst, the polyethylene resin composition in accordance with this invention has very good storage stability, and undergoes little change even when allowed to stand for long periods of time without heat-foaming. Even when it is heated after storage for long periods of time, the state of the cells and the expansion ratio are scarcely different from those of a composition immediately after preparation. Foams of good quality can be prepared from such a polyethylene composition in accordance with this invention.

Another advantage of the polyethylene resin composition is that it can be fabricated into any desired shape such as a board, pipe and rod as well as a thin sheet because there is no restriction on the shape or thickness of the shaped structure.

The foamable and crosslinkable polyethylene resin composition can be shaped in accordance with this invention into any desired shape such as a sheet, rod, cylinder, board or block. The shaping can be effected by various conventional shaping methods such as injection molding, extrusion molding or blow molding.

The resulting shaped article can be expanded and crosslinked by heating it, either immediately after shaping or after, if desired, pre-crosslinking, to a temperature above the decomposition temperature of the heat-decomposable blowing agent. The heating temperature varies according to the types of the blowing agent and the organic peroxide used. Usually, however, it is at least 180° C., preferably 200° to 230° C. Generally, the expanding/cross-linking and the decomposition of the organic peroxide can be completed within 1 to 20 minutes.

As a result of such heating, a small amount of moisture in the shaped article or the moisture in the ambient atmosphere and the silanol condensation catalyst act together to hydrolyze the silane compound bonded to polyethylene resin, and then a condensation reaction occurs to cause the chemical crosslinking of the silane. This in turn results in the crosslinkage of the modified polyethylene to increase its viscoelasticity.

When the zinc salt of higher carboxylic acid is used as a silanol condensation catalyst, a crosslinking reaction of the polyethylene composition becomes vigorous only at temperature far higher than the temperature employed in the melt-kneading, and is not particularly active when the decomposition of the heat-decomposable blowing agent does not occur. For this reason, the formation of a main crosslinkage in the silane-modified polyethylene is effected in a step of heating the shaped article to a temperature above the decomposition temperature of the blowing agent.

Substantially at the same time as the proceeding of the crosslinking reaction, the heat-decomposable blowing agent decomposes under heat to generate gas such as nitrogen, and therefore, the shaped article softened by heat is converted to a foamed structure. Simultaneously, the organic peroxide also decomposes.

The heating of the shaped article can be effected, for example, by radiation from an infrared lamp, application of a hot air, or immersion in a heated liquid bath.

The present invention thus provides a polyethylene resin foam which is highly crosslinked and has superior thermal stability and heat-sealability.

The advantages brought about by the present invention are summarized below.

In the present invention, polyethylene resin is reacted with the silane compound before or during the melt-kneading operation to foam modified polyethylene containing the silane compound in its side chain. When this modified polyethylene is subjected to high temperatures in the presence of the silanol condensation catalyst, the silane compound is chemically bonded to itself by hydrolysis and condensation caused by the moisture in the ambient atmosphere, which results in the crosslinking of the silane-modified polyethylene resin. The cross-linking reaction is promoted in the presence of a product formed by the decomposition of the heat-decomposable blowing agent, especially azodicarbonamide. In the present invention, the polyethylene resin is formed and crosslinked simultaneously in the step of heating the shaped article to a temperature above the decomposition temperature of the blowing agent. The use of this method can increase the density of crosslinkages in the final product.

For this reason, a polyethylene resin foam having a high crosslinkage density, that is, having superior thermal stability can be obtained. In contrast, in the conventional method in which a resin is first crosslinked and then foamed, too high a density of crosslinkage makes the foaming of the crosslinked resin difficult, which in turn leads to the difficulty of obtaining foams having superior thermal stability.

Furthermore, in the present invention, the cross-linking of the resin by the higher carboxylic acid zinc salt scarcely occurs at the time of melt-kneading and shaping the resin composition, and therefore, no abrupt rise in viscosity of the resin occurs in these steps. Thus, conventional procedures employed for fabricating polyethylene can be applied in these steps. The resin can be fabricated into various shapes such as a rod, cylinder, and concave as well as a sheet, and by foaming such a fabricated article under heat, an expanded article having a complicated shape conforming to the shape of the above fabricated article can be obtained.

Moreover, the present invention does not require the application of ionizing radiation for cross-linking polyethylene, and therefore, can obviate the use of large-scale dangerous equipment required for radiation.

The most characteristic advantage of the present invention is that since an organic peroxide is incorporated before heat-foaming in a shaped article of a composition based on a silane-modified polyethylene resin, a foamed article obtained by heat-foaming the shaped article has not only superior thermal stability but also markedly improved heat-sealability. The present invention also provides a shaped article having superior heat-sealability not only at its surface but also in its interior. Specifically, when such an article is sliced, the sliced surface which has been the interior of the article has equally superior heat-sealability. Accordingly, the resulting foamed shaped article can be easily bonded to itself or to another material by mere heating without using an adhesive or a solvent. Thus, in the production of a laminate or cylindrical article from the foamed sheet by secondary processing, it is not necessary to use an adhesive. This is not only economical, but also obviates the problem of fire or toxicity.

It is not entirely clear why the heat-sealability of the foamed article can be improved by the method of this invention. It is presumed however that the organic peroxide used in the step of heat-forming is decomposed to oxidize the resin which constitutes the foamed article, and the surface condition of the resin changes to a condition suitable for heat melting.

The crosslinked polyethylene resin foams prepared by the present invention can be used in various applications, for example as a cushioning material, a warmth-retaining material for hot water supply pipes, and a heat insulating or sound-proofing material to be embedded in house walls. Since the polyethylene foams in accordance with this invention have especially good thermal stability, they can be suitably used as a heat insulating material for pipes that transport a cooling or heating medium in the form of a cylindrical shaped structure.

The following Examples and Comparative Examples illustrate the present invention specifically.

The gel content (% by weight) and the heat shrinkage (%) in the present specification and the appended claims were measured by the following methods.

(1) Gel Content

Measured by the hot xylene method. Specifically, a weighed test piece was dipped in xylene heated at 110° C., and the insoluble material was taken out 24 hours later. After thorough drying, its weight was measured. The gel content was calculated from the measured value in accordance with the following equation.

$$\text{Gel content (\%)} = \frac{\text{Weight of the xylene-insoluble material after sufficient drying}}{\text{Weight of the test piece before dipping}} \times 100$$

(2) Heat Shrinkage (change of expansion ratio)

A test piece, 100 mm × 100 mm × 8 mm, was prepared from the foamed article prepared in each of the examples, and after measuring its expansion ratio, it was fed into a Geer's oven and heated at 120° C. for 24 hours. The test piece was then taken out of the Geer's oven and allowed to cool. The expansion ratio of the test piece after cooling was measured, and its heat shrinkage was calculated from the measured value in accordance with the following equation.

$$\text{Heat shrinkage (\%)} = \frac{\left(\text{Expansion ratio of the test piece after heating}\right) - \left(\text{Expansion ratio of the test piece before heating}\right)}{\text{Expansion ratio of the test piece before heating}} \times 100$$

EXAMPLES 1 to 5 and Comparative Example 1

A mixture composed of 100 parts of polyethylene (melt index 7.0; density 0.927 g/cm$^3$), 2 parts by weight of vinyltriethoxysilane and 0.12 part by weight of dicumyl peroxide was fed into a monoaxial extruder, and melt-kneaded at 190° C. for 3 minutes. The kneaded mixture was then shaped into pellets. The resulting pellets were pellets of silane-modified polyethylene having triethoxysilane in the side chain.

A mixture composed of 100 parts by weight of the resulting silane-modified polyethylene pellets, 15 parts by weight of azodicarbonamide, 2 parts by weight zinc stearate, and dicumyl peroxide in each of the amounts indicated in Table 1 was fed into a monoaxial extruder, and melt-kneaded at 135° C. for 5 minutes. It was then extrusion-molded into an expandable sheet having a thickness of 3 mm. The resulting expandable sheet was fed into a hot air oven, and preheated at 90° C. for 16 hours. The gel content of the expandable sheet which had been heated was measured, and the results are shown in Table 1 under the column "Expandable sheet gel".

The preheated sheet was fed into a hot air oven, and heat-treated at 210° C. for 4 minutes to obtain a foamed article. The expansion ratio, the gel content and the heat shrinkage (change of expansion ratio) were measured.

TABLE 1

| Examples and Comparative Example | Amounts of dicumyl peroxide (parts by weight) | Expandable sheet gel (wt.%) | Expansion ratio (cm$^3$/g) | Foam gel content (wt.%) | Change of expansion ratio (%) |
|---|---|---|---|---|---|
| Comparative Example 1 | 0 | 30.5 | 32.1 | 71.0 | −16.3 |
| Example 1 | 0.05 | 31.8 | 31.5 | 73.1 | −18.0 |
| Example 2 | 0.10 | 30.3 | 30.8 | 72.5 | −16.5 |
| Example 3 | 0.20 | 31.2 | 31.0 | 74.5 | −17.5 |
| Example 4 | 0.30 | 31.5 | 31.0 | 74.1 | −18.5 |
| Example 5 | 0.50 | 31.2 | 29.5 | 75.0 | −19.8 |

In order to examine the heat-sealability of the foamed article, a rectangular iron plate having a thickness of 2 mm was fed into an oven held at a temperature of 120° to 210° C. and heated for 3 minutes. It was then laminated onto the surface of the foamed article, and pressed for 30 seconds, followed by cooling.

On the assumption that the temperature of heating the iron plate was the heat-melting temperature, the state of melting of the foamed article was examined at each of the heat-melting temperatures. The results are shown in Table 2. The rate of heat melting in the table is a measure for the state of bonding between the foamed article and the iron plate, and is defined as the ratio of the area of the foamed article remaining adhered to the iron plate upon peeling the foamed article after bonding, based on the area of the foamed article as bonded. The larger the value, the higher the heat-sealability of the foamed article.

TABLE 2

| Examples and Comparative Example | Amount of dicumyl peroxide (parts by weight) | Rate of heat-melting (%) | | | | | | |
|---|---|---|---|---|---|---|---|---|
| | | 210° C. | 190° C. | 170° C. | 150° C. | 140° C. | 130° C. | 120° C. |
| Comparative Example 1 | 0 | 95 | 30 | 5 | 0 | 0 | 0 | 0 |

TABLE 2-continued

| Examples and Comparative Example | Amount of dicumyl peroxide (parts by weight) | Rate of heat-melting (%) | | | | | | |
|---|---|---|---|---|---|---|---|---|
| | | 210° C. | 190° C. | 170° C. | 150° C. | 140° C. | 130° C. | 120° C. |
| Example 1 | 0.05 | 100 | 100 | 70 | 70 | 60 | 60 | 10 |
| Example 2 | 0.10 | 100 | 100 | 100 | 80 | 60 | 60 | 10 |
| Example 3 | 0.20 | 100 | 100 | 100 | 80 | 80 | 70 | 50 |
| Example 4 | 0.30 | 100 | 100 | 100 | 85 | 80 | 70 | 50 |
| Example 5 | 0.50 | 100 | 100 | 100 | 85 | 80 | 70 | 50 |

The above results demonstrate that the addition of a small amount of dicumyl peroxide to the silane-modified polyethylene resin markedly improved its heat-sealability. It can also be seen that the dimensional stability of the silane-modified polyethylene resin at the time of heating is not particularly reduced by the addition of dicumyl peroxide, as shown in the column "Change of expansion ratio".

EXAMPLES 6 and 7

The sheets obtained in Examples 4 and 5 which contained 0.3 part by weight and 0.5 part by weight respectively of dicumyl peroxide were heat-treated in the same way as in Examples 1 to 5 without preheating at 90° C. for 16 hours. The heat-sealability of the resulting foamed articles was examined.

The gel contents of the resulting expandable sheets, the expansion ratios, the foam gel content and the heat shrinkage of the foamed articles are shown in Table 3, and the heat-sealabilities of the foamed articles are shown in Table 4. For easy comparison, the results of Comparative Example 1 are also shown in these tables.

TABLE 3

| | Amount of dicumyl peroxide (parts by weight) | Expandable sheet gel (wt.%) | Expansion ratio (cm³/g) | Foam gel content (wt.%) | Change of expansion ratio (%) |
|---|---|---|---|---|---|
| Comparative Example 1 | 0 | 30.5 | 32.1 | 71.0 | −16.3 |
| Example 6 | 0.30 | 17.6 | 31.5 | 68.9 | −15.2 |
| Example 7 | 0.50 | 18.4 | 30.1 | 70.2 | −17.5 |

TABLE 4

| | Amount of dicumyl peroxide (parts by weight) | Rate of heat-melting (%) | | | | | | |
|---|---|---|---|---|---|---|---|---|
| | | 210° C. | 190° C. | 170° C. | 150° C. | 140° C. | 130° C. | 120° C. |
| Comparative Example 1 | 0 | 95 | 30 | 5 | 0 | 0 | 0 | 0 |
| Example 6 | 0.3 | 100 | 100 | 100 | 90 | 80 | 70 | 50 |
| Example 7 | 0.5 | 100 | 100 | 100 | 90 | 80 | 70 | 50 |

Tables 3 and 4 show that when the gel content of the expandable sheet was decreased to 17 to 19% by weight, the results were not substantially different from those obtained with the sheets having a gel content of about 30% (Examples 1 to 5), and the heat shrinkage did not increase.

EXAMPLE 8

A mixture composed of 100 parts by weight of the silane-modified polyethylene pellets synthesized in Example 1, 15 parts by weight of azodicarbonamide, 2 parts by weight of zinc stearate and 0.2 part by weight of 2,5-dimethyl-2,5-di(t-butyl peroxy)hexane was treated in the same way in Example 1 to afford an expandable sheet. The sheet was fed into a hot air dryer, and preheated at 90° C. for 16 hours. The resulting preheated expandable sheet (to be referred to as "sheet A") and the expandable sheet not preheated (to be referred to as "sheet B") were each treated in the same way as in Example 1 to form expanded articles. The heat-sealability of each of these foamed articles were measured in the manner described hereinabove.

The gel content of the expandable sheet, the expansion ratio, the foam gel content and the heat shrinkage of the foamed articles are shown in Table 5. The results of the test on heat-sealability are shown in Table 6. For easy comparison, the results of Comparative Example 1 are also shown in these tables.

TABLE 5

| | Expandable sheet gel (wt. %) | Expansion ratio (cm³/g) | Foam gel content (wt. %) | Change of expansion ratio (%) |
|---|---|---|---|---|
| Comparative Example 1 | 30.5 | 32.1 | 71.0 | −16.3 |
| Sheet A | 30.8 | 31.2 | 73.0 | −18.1 |
| Sheet B | 17.5 | 32.0 | 67.5 | −15.3 |

TABLE 6

| | Rate of heat-melting (%) | | | | | | |
|---|---|---|---|---|---|---|---|
| | 210° C. | 190° C. | 170° C. | 150° C. | 140° C. | 130° C. | 120° C. |
| Comparative Example 1 | 95 | 30 | 5 | 0 | 0 | 0 | 0 |
| Sheet A | 100 | 100 | 100 | 80 | 75 | 60 | 50 |

TABLE 6-continued

| | Rate of heat-melting (%) | | | | | | |
|---|---|---|---|---|---|---|---|
| | 210° C. | 190° C. | 170° C. | 150° C. | 140° C. | 130° C. | 120° C. |
| Sheet B | 100 | 100 | 100 | 85 | 80 | 70 | 50 |

Tables 5 and 6 show that when 2,5-dimethyl-2,5-di(t-butyl peroxy)hexane was used as the organic peroxide, the heat-sealability of the silane-modified polyethylene resin composition was improved in the same way as in the case of using dicumyl peroxide, and its heat shrinkage did not increase.

What we claim is:

1. A process for producing a foamed and cross-linked polyethylene resin shaped article having improved heat-sealability which comprises adding (b) a heat-decomposable blowing agent, (c) a silanol condensation catalyst and (d) an organic peroxide having a decomposition temperature the same as or similar to that of the heat-decomposable blowing agent (b) to (a) a silane-modified polyethylene resin, the amount of said organic peroxide (d) being at least 0.005 part by weight per 100 parts by weight of the silane-modified polyethylene resin (a); melt-kneading the resulting mixture at a temperature lower than the decomposition temperature of the heat-decomposable blowing agent (b); shaping the mixture; and heating the resulting foamble and crosslinkable shaped article to the decomposition temperature of the heat-decomposable blowing agent or to a higher temperature thereby to foam and cross-link the silane-modified polyethylene resin.

2. The process of claim 1 wherein the silane-modified polyethylene resin is obtained by chemically bonding a silane compound containing at least one unsaturated group to a polyethylene resin in the presence of a radical generator.

3. The process of claim 2 wherein the silane compound is selected from the group consisting of vinyltrimethoxysilane and vinyltriethoxysilane.

4. The process of claim 1 wherein the heat-decomposable blowing agent has a decomposition temperature of more than 140° C.

5. The process of claim 1 wherein the heat-decomposable blowing agent has a decomposition temperature within the range of 170° to 220° C.

6. The process of claim 1 wherein the heat-decomposable blowing agent is selected from the group consisting of azodicarbonamide, dinitrosopentamethylene tetramine, benzenesulfonyl hydrazide and toluenesulfonyl hydrazide.

7. The process of claim 1 wherein the heat-decomposable blowing agent is used in an amount of at least 0.1 part by weight per 100 parts by weight of the silane-modified polyethylene resin.

8. The process of claim 1 wherein the silanol condensation catalyst is a zinc salt of a higher carboxylic acid.

9. The process of claim 8 wherein the zinc salt of a higher carboxylic acid is selected from the group consisting of zinc salts of aliphatic and alicyclic carboxylic acids containing 8 to 20 carbon atoms.

10. The process of claim 1 wherein the silanol condensation catalyst is selected from the group consisting of zinc stearate, zinc octanoate, zinc laurate and zinc naphthenate.

11. The process of claim 1 wherein the silanol condensation catalyst is used in an amount of at least 0.01 part by weight per 100 parts by weight of the silane-modified polyethylene resin.

12. The process of claim 1 wherein the organic peroxide has a decomposition temperature of more than 140° C.

13. The process of claim 1 wherein the organic peroxide has a decomposition temperature within the range of 170° to 220° C.

14. The process of claim 1 wherein the organic peroxide has a half life of at least 0.5 minute at the melt-kneading temperature.

15. The process of claim 1 wherein the organic peroxide is selected from the group consisting of ketone peroxides, hydroperoxides, dialkyl peroxides and peroxy esters.

16. The process of claim 1 wherein the organic peroxide is selected from the group consisting of dicumyl peroxide, 2,5-dimethylhexane-2,5-dihydroperoxide and 2,5-dimethyl-2,5-di(tert-butyl peroxy)hexane.

17. The process of claim 1 wherein the organic peroxide is used in an amount of at least 0.005 part by weight per 100 parts by weight of the silane-modified polyethylene resin.

18. The process of claim 1 wherein the organic peroxide is used in an amount of 0.01 to 1.0 part by weight per 100 parts by weight of the silane-modified polyethylene resin.

19. The process of claim 1 wherein the melt-kneading is carried out at a temperature of about 110° C. to about 150° C.

20. The process of claim 1 wherein the foamable and crosslinkable shaped article has a gel content of not more than 45% by weight.

21. The process of claim 1 wherein the shaped article is in the form of a sheet, rod, cylinder, board or block.

22. The process of claim 1 wherein the heat-decomposable blowing agent is used in an amount of 1 to 30 parts by weight per 100 parts by weight of the silane-modified polyethylene resin.

23. The process of claim 1 wherein the silanol condensation catalyst is used in an amount of 0.1 to 20 parts by weight per 100 parts by weight of the silane-modified polyethylene resin.

24. The process of claim 1 wherein the foamable and crosslinkable shaped article has a gel content of 10 to 40% by weight.

25. The process of claim 3 wherein the heat-decomposable blowing agent is selected from the group consisting of azodicarbonamide, dinitrosopentamethylene tetramine, benzenesulfonyl hydrazide and toluenesulfonyl hydrazide, the silanol condensation catalyst is selected from the group consisting of zinc stearate, zinc octanoate, zinc laurate and zinc naphthenate; and the organic peroxide is selected from the group consisting of dicumyl peroxide, 2,5-dimethylhexane-2,5-dihydroperoxide and 2,5-dimethyl-2,5-dimethyl-2,5-di(tert-butyl peroxy)hexane.

26. The process of claim 25 wherein the heat-decomposable blowing agent is used in an amount of at least 0.1 part by weight per 100 parts by weight of the silane-modified polyethylene resin; the silanol condensation catalyst is used in an amount of at least 0.01 part by weight per 100 parts by weight of the silane-modified polyethylene resin and the organic peroxide is used in an amount of at least 0.005 part by weight per 100 parts by weight of the silane-modified polyethylene resin.

27. The process of claim 26 wherein, per 100 parts by weight of the silane-modified polyethylene resin, the heat-decomposable blowing agent is used in an amount of 1 to 30 parts by weight, the silanol condensation catalyst is used in an amount of 0.1 to 20 parts by weight, and the organic peroxide is used in an amount of 0.01 to 1.0 part by weight.

28. The process of claim 27 wherein the silanol condensation catalyst is zinc stearate.

29. A heat sealable foamed and cross-linked silane-modified polyethylene resin shaped article produced by the process of claim 1.

30. The process of claim 1 wherein the organic peroxide (d) is used in amount of 0.05 to 0.5 part by weight, per 100 parts by weight of the silane-modified polyethylene resin (a).

31. The process of claim 1 wherein the organic peroxide (d) is used in amount of 0.1 to 0.3 part by weight, per 100 parts by weight of the silane-modified polyethylene resin (a).

32. A foamable and cross-linkable polyethylene resin composition comprising
(a) a silane-modified polyethylene resin,
(b) a heat-decomposable blowing agent,
(c) a silanol condensation catalyst, and
(d) an organic peroxide in an amount of at least 0.005 part by weight per 100 parts by weight of the silane-modified polyethylene resin (a), the ingredients (a), (b), (c) and (d) having been melt-kneaded with one another at a temperature lower than the decomposition temperature of the heat-decomposable blowing agent.

33. The composition of claim 32 wherein the silane-modified polyethylene resin is obtained by chemically bonding a silane compound containing at least one unsaturated group to a polyethylene resin in the presence of a radical generator.

34. The composition of claim 33 wherein the silane compound is selected from the group consisting of vinyltrimethoxysilane and vinyltriethoxysilane.

35. The composition of claim 33 wherein the silane compound is selected from the group consisting of vinyltriethoxysilane and vinyltriethoxysilane.

36. The composition of claim 32 wherein the heat-decomposable blowing agent has a decomposition temperature of 170° to 220° C.

37. The composition of claim 32 wherein the heat-decomposable blowing agent is selected from the group consisting of azodicarbonamide, dinitrosopentamethylene tetramine, benzenesulfonyl hydrazide and toluenesulfonyl hydrazide.

38. The composition of claim 32 wherein the heat-decomposable blowing agent is used in an amount of at least 0.1 part by weight per 100 parts by weight of the silane-modified polyethylene resin.

39. The composition of claim 32 wherein the silanol condensation catalyst is a zinc salt of a higher carboxylic acid.

40. The composition of claim 39 wherein the zinc salt of a higher carboxylic acid is selected from zinc salts of aliphatic and alicyclic carboxylic acids containing 8 to 20 carbon atoms.

41. The composition of claim 32 wherein the silanol condensation catalyst is selected from the group consisting of zinc stearate, zinc octanoate, zinc laurate and zinc naphthenate.

42. The composition of claim 32 wherein the silanol condensation catalyst is used in an amount of at least 0.01 part by weight per 100 parts by weight of the silane-modified polyethylene resin.

43. The composition of claim 32 wherein the organic peroxide has a decomposition temperature same as or similar to that of the heat-decomposable blowing agent.

44. The composition of claim 32 wherein the organic peroxide has a decomposition temperature of more than 140° C.

45. The composition of claim 32 wherein the organic peroxide has a decomposition temperature of 170° to 220° C.

46. The composition of claim 32 wherein the organic peroxide has a half life of at least 0.5 minute at the melt kneading temperature.

47. The composition of claim 32 wherein the organic peroxide is selected from the group consisting of ketone peroxides, hydroperoxides, dialkyl peroxides and peroxy esters.

48. The composition of claim 32 wherein the organic peroxide is selected from the group consisting of dicumyl peroxide, 2,5-dimethylhexane-2,5-dihydroperoxide and 2,5-dimethyl-2,5-di(tert-butyl peroxy)hexane.

49. The composition of claim 32 wherein the organic peroxide is used in an amount of 0.01 to 1.0 part by weight per 100 parts by weight of the silane-modified polyethylene resin.

50. The composition of claim 32 which has a gel content of not more than 45% by weight.

51. The composition of claim 32 which is in the form of a sheet, rod, cylinder, board or block.

52. The composition of claim 32 wherein the heat-decomposable blowing agent is used in an amount of 1 to 30 parts by weight per 100 parts by weight of the silane-modified polyethylene resin.

53. The composition of claim 32 wherein the silanol condensation catalyst is used in an amount of 0.1 to 20 parts by weight per 100 parts by weight of the silane-modified polyethylene resin.

54. The composition of claim 32 which has a gel content of 10 to 40% by weight.

55. The composition of claim 34 wherein the heat-decomposable blowing agent is selected from the group consisting of azodicarbonamide, dinitrosopentamethylene tetramine, benzenesulfonyl hydrazide and toluenesulfonyl hydrazide; the silanol condensation catalyst is selected from the group consisting of zinc stearate, zinc octanoate, zinc laurate and zinc naphthenate; and the organic peroxide is selected from the group consisting of ketone peroxides, hydroperoxides, dialkyl peroxides and peroxy esters.

56. The composition of claim 55 wherein the heat-decomposable blowing agent is used in an amount of at least 0.1 part by weight per 100 parts by weight of the silane-modified polyethylene resin; the silanol condensation catalyst is used in an amount of at least 0.01 part by weight per 100 parts by weight of the silane-modified polyethylene resin; and the organic peroxide is used in an amount of at least 0.005 part by weight per 100 parts by weight of the silane-modified polyethylene resin.

57. The composition of claim 56 wherein, per 100 parts by weight of the silane-modified polyethylene resin, the heat-decomposable blowing agent is used in an amount of 1 to 30 parts by weight, the silanol condensation catalyst is used in an amount of 0.1 to 20 parts by weight, and the organic peroxide is used in an amount of 0.01 to 1.0 part by weight.

58. The composition of claim 57 wherein the silanol condensation catalyst is zinc stearate.

* * * * *

UNITED STATES PATENT AND TRADEMARK OFFICE
CERTIFICATE OF CORRECTION

PATENT NO. : 4,252,906
DATED : February 24, 1981
INVENTOR(S) : Seiya Hosokawa; Ken Shinkai; Tateo Takasuka; and Yutaka Ozaki It is certified that error appears in the above—identified patent and that said Letters Patent is hereby corrected as shown below:

IN THE CLAIMS:

Please cancel claim 17 in its entirety.

Signed and Sealed this

Twelfth Day of May 1981

[SEAL]

Attest:

RENE D. TEGTMEYER

Attesting Officer     Acting Commissioner of Patents and Trademarks